April 30, 1968   R. G. GUENTER   3,380,386
PROPELLANT GRAINS
Filed July 16, 1965
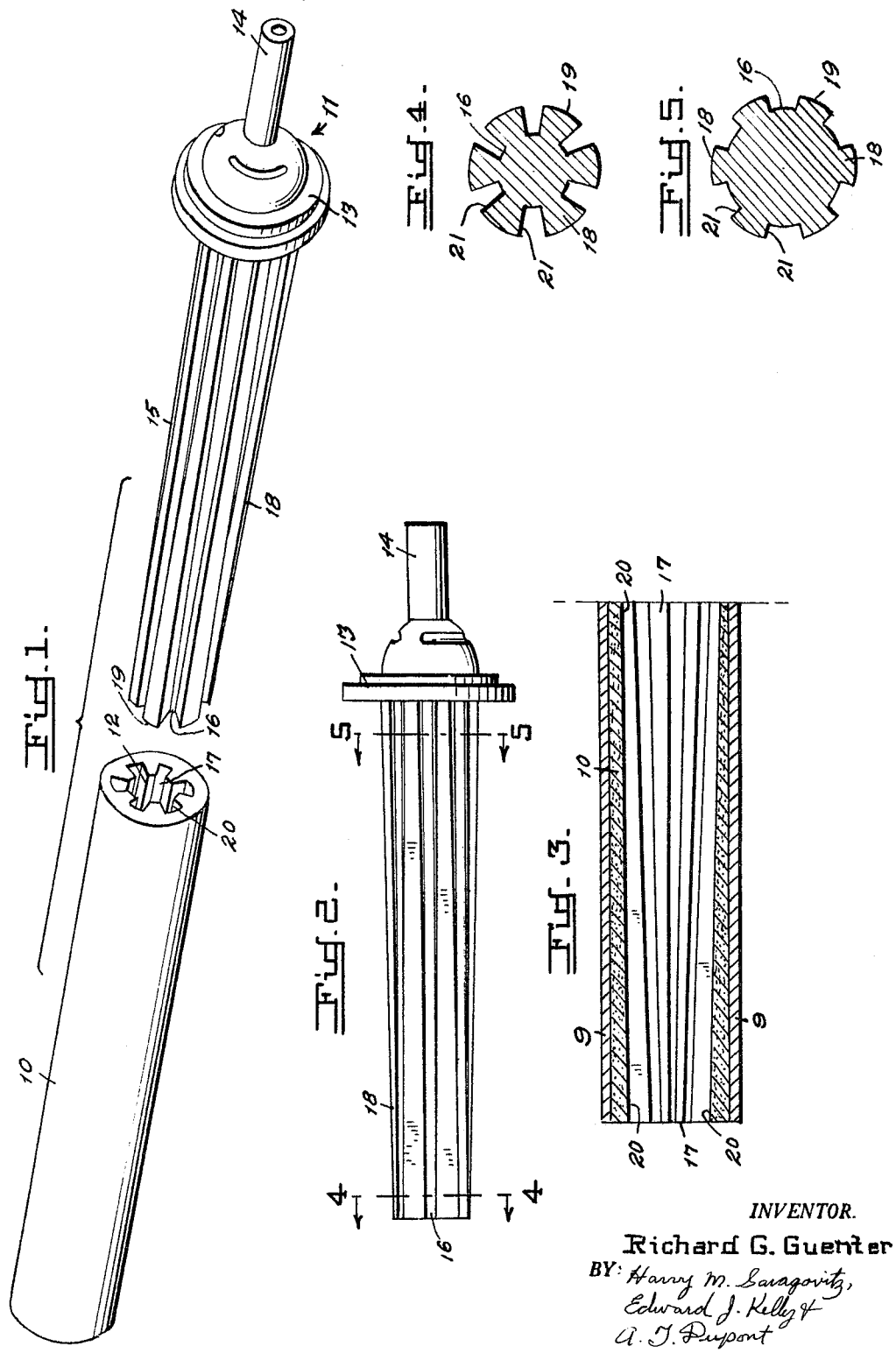
INVENTOR.
Richard G. Guenter
BY: Harry M. Saragovitz,
Edward J. Kelly &
A. J. Dupont

United States Patent Office 3,380,386
Patented Apr. 30, 1968

3,380,386
PROPELLANT GRAINS
Richard G. Guenter, Wilmington, Del., assignor, by mesne assignments, to the United States of America as represented by the Secretary of the Army
Filed July 16, 1965, Ser. No. 472,743
3 Claims. (Cl. 102—99)

This invention relates to double-base powder grains and more particularly to a novel grain of this character which is resistant to fisurring and has improved burning qualities, and to a new method by which the grain may be made.

The powder grain of this invention has various uses but may be employed to particular advantage for purposes requiring relatively large grain sizes, as for example, for the propellant charge in a jet propulsion rocket. Accordingly, for purposes of illustration the invention will be described in the form of a rocket propellant charge, although it will be understood that the invention is not limited to this use.

Jet propulsion rockets have been employed heretofore in which the propellant charge is in the form of a single powder grain made from sheet stock of a double-base powder. In such rockets, it is desirable to use a powder grain having neutral or slightly regressive burning characteristics and which does not produce excessive pressures. However it has been found that grains made from ordinary sheet stock exhibit a marked fissuring and disintegration resulting in a substantial increase in the burning rate and the pressure as the reaction proceeds.

Extruded powder grains appear to be relatively homogeneous, but they do not have uniform deflagrating characteristics, as evidenced by the fact that partially burned samples have substantial fissures or bubbles resembling worm holes and show sharp edges, in contrast to the rounded contours inherent in grains which burn uniformly. As a result of the disintegration of these grains, they produce widely varying pressures and undergo progressive burning, which is undesirable in rocket motors and other applications.

It is therefore an object of this invention to produce a powder grain which is resistant to fissuring and disintegration during combustion and burns at a uniform rate.

Another object of this invention is to provide a method of making a large powder grain by extrusion to render the finished product free of bubbles.

A further object of the invention resides in the provision of a large powder grain of generally cylindrical form with a tapered axial passage having communicating radial arcuate recesses tapered towards the axial passage and tapered longitudinally in depth in the opposite direction from the axial passage to meet the desired ballistic design.

These and other objects of the invention may be better understood from the following detailed description of one method accomplishing these objects and illustration of one form of the new large powder grain. On the drawing:

FIGURE 1 is a perspective view of the propellant grain and the mandrel;
FIGURE 2 is a side view of the mandrel;
FIGURE 3 is a longitudinal section of the finished propellant grain in a casing;
FIGURE 4 is a cross-section of the stake taken on the line 4—4 of FIGURE 2; and
FIGURE 5 is a cross-section of the stake on the 5—5 line of FIGURE 2.

The propellant grain 10 for a rocket motor is formed by extrusion to eliminate bubbles in a mold (not shown) using a mandrel 11 to provide a channel 12 within the grain so designed as to produce certain geometrical configurations which direct the burning within the grain in such a manner that the grain will burn uniformly and to a great degree eliminate the irregular burning usually experienced in propellant grains and the accompanying disadvantages resulting therefrom.

The particular shape of the channel 12 is formed by the stake 15 which has a base plate 13 and a handle 14 attached thereto, as means of withdrawing the mandrel 11 after the grain has been formed. The mandrel 11 consists of a tapered cylindrical stake 15 attached to the side of the base plate 13 opposite the handle 14, the stake tapering away from the base plate 13 to permit ready removal of the stake 15 when the grain has solidified. The stake 15 comprises an axial member 16 and is in the center of the propellant grain and coaxial therewith. The axial member 16 tapers away from the base plate 13 in the same direction as the stake 15 and is adapted to produce an axial cavity 17 in the finished grain to direct the interior burning of the propellant. Radial projections 18 extend from the axial member 16 and extend longitudinally the entire length of said axial member. The arcuate surfaces or bases 19 of the radial projections 18 form the outer periphery of the stake 15. The projections 18 have sides 21 tapered towards the axis of member 16 but the sides do not completely converge so as to provide recesses 20 in the grain that are always in communication with the axial cavity 17. The depth of the radial projections 18 is greatest where the diameter of the axial member 16 is the smallest as shown in FIGURE 4 and the radial depth decreases as the diameter of the axial member 15 increases towards the base plate 13 as shown by FIGURE 5. Since the arcuate base 19 forms the exterior of the stake 15, the radial projections 18 will taper on the exterior longitudinally away from the base plate 13 and in the same direction as the axial member 16, therefore the recesses 20 in the finished grain will follow the same configuration when the mandrel is removed.

FIGURE 3 shows the finished grain 10 in a casing 9. It is next loaded into a rocket motor so that the larger end of cavity 17 is located toward the aft or nozzle end of the motor. When the rocket motor is fired, an igniter initiates burning on all exposed propellant surfaces essentially simultaneously. Since the pressure developed by the gases of combustion of the propellant is affected by the ratio of the quantity of gas to the cross-sectional area of the cavity 17 down which the gases must pass to reach the nozzle, it is apparent that cavity 17 should be larger at the nozzle end than at the opposite, or forward end.

Heretofore, propellant grains produced by extrusion processes were limited in perforation or cavity shape to a constant cross-section throughout the length of the grain. Thus, if the cavity 17 were made sufficiently large at the aft or nozzle end to permit ready flow of the gases, the cavity at the forward end was larger than needed, and a less efficient motor resulted. Conversely, if the cavity were made small at the forward end for maximum motor efficiency, that cavity at the aft end was too small to permit ready passage of the gases, and excessive pressures were developed.

This process permits the production of a grain 15.4 inches in diameter and 10 feet in length. It also contemplates the building of larger grains by producing segments and putting them together to obtain an even larger single grain. In addition, by the use of this extrusion process, two or more propellant materials of different characteristics may be employed as well as grains having non-parallel external surfaces.

Combustion of this large single grain is initiated at the small end of the axial passage, but at this point the radial recesses have their greatest depth and their largest area exposed. As combustion proceeds, while the area of the axial passage increases slightly, the overall area exposed decreased with the size of the recesses, tending to prevent progressive burning with accompanying disadvantages and actually causes a regressive burning effect to obtain constant pressure and a uniform rate of combustion.

What is claimed is:

1. A propellant for rocket motors, which comprises a generally tubular propellant grain having a cylindrical outer surface and tapering internal surface and further having a forward end and a nozzle end, the internal diameter of said grain uniformly increasing from said forward end to said nozzle end, uniformly spaced radial projections extending longitudinally the full length of said grain and projecting radially from said internal surface toward a longitudinal axis of said grain, the radial depth of said projections reducing in dimension from the forward end to the nozzle end of said grain and defining a tapered axial passage.

2. A propellant for rocket motors as claimed in claim 1, wherein the width said projections reduces radially from said internal surface to said axis of said grain.

3. A mandrel for a molded grain propellant adapted to provide geometrical recesses therein, comprising a base acting as a closure for the mold, a handle attached to one side of said base plate for removal of the mandrel, a stake of tapered exterior diameter attached to the other side of said base plate for forming the recesses in the grain and tapered away from the base plate, said stake consisting of a center axial member tapering away from said base plate, radial projections attached to said axial member extending longitudinally the entire length thereof, said radial projections having an arcuate base coinciding with exterior of the stake and sides uniformly tapered towards the axial member, said projections having a radial depth that decreases as the diameter of the axial member increases, the arcuate base of said radial projections being tapered longitudinally in the same direction as the axial member, and the passage in the grain provided upon removal of the mandrel, so constructed and arranged that the overall burning area decreases as the area of the axial passage increases and the area of the recesses decreases.

References Cited
UNITED STATES PATENTS

| | | | |
|---|---|---|---|
| 3,001,363 | 9/1901 | Thibodaux et al. | 264—3 X |
| 3,088,273 | 5/1963 | Adelman et al. | 60—35.6 |
| 3,250,829 | 5/1966 | Wall | 102—98 |

ROBERT F. STAHL, *Primary Examiner.*

BENJAMIN A. BORCHELT, *Examiner.*